US012589521B2

(12) United States Patent
Thompson

(10) Patent No.: US 12,589,521 B2
(45) Date of Patent: Mar. 31, 2026

(54) DRAINAGE PLATES FOR CERAMIC EXTRUSION

(71) Applicant: CORNING INCORPORATED, Corning, NY (US)

(72) Inventor: Eric Lee Thompson, Livonia, NY (US)

(73) Assignee: CORNING INCORPORATED, Corning, NY (US)

( * ) Notice: Subject to any disclaimer, the term of this patent is extended or adjusted under 35 U.S.C. 154(b) by 323 days.

(21) Appl. No.: 18/036,295

(22) PCT Filed: Nov. 22, 2021

(86) PCT No.: PCT/US2021/060255
§ 371 (c)(1),
(2) Date: May 10, 2023

(87) PCT Pub. No.: WO2022/115351
PCT Pub. Date: Jun. 2, 2022

(65) Prior Publication Data
US 2024/0001589 A1      Jan. 4, 2024

Related U.S. Application Data

(60) Provisional application No. 63/119,030, filed on Nov. 30, 2020.

(51) Int. Cl.
B29C 48/00      (2019.01)
B28B 3/26      (2006.01)
(Continued)

(52) U.S. Cl.
CPC ............ B28B 3/269 (2013.01); B29C 48/022 (2019.02); B29C 48/11 (2019.02); B29C 48/274 (2019.02); B29C 48/761 (2019.02)

(58) Field of Classification Search
CPC ........ B29C 48/761; B29C 48/11; B28B 3/269
See application file for complete search history.

(56) References Cited

U.S. PATENT DOCUMENTS

| | | | | |
|---|---|---|---|---|
| 6,817,858 B2 * | 11/2004 | Howsam | ................... | A23J 3/26 |
| | | | | 425/464 |
| 2020/0269466 A1 | 8/2020 | Hodel et al. | | |
| 2022/0106980 A1 * | 4/2022 | Imura | .................. | F16J 15/3256 |

FOREIGN PATENT DOCUMENTS

| | | |
|---|---|---|
| CN | 104527029 A | 4/2015 |
| DE | 9411737 U1 | 1/1995 |

(Continued)

OTHER PUBLICATIONS

European Patent Application No. 21839286.8 Communication pursuant to Article 94(3) EPC dated May 2, 2025; 5 Pages; European Patent Office.

(Continued)

*Primary Examiner* — John J DeRusso
(74) *Attorney, Agent, or Firm* — Kevin M. Able

(57)      ABSTRACT

A drainage plate (10) for an extruder assembly including a body (12) having an inner edge (14) and an outer edge (15). A seal portion (24) of the body extends radially from the inner perimeter toward the outer perimeter. One of more drainage features are located radially outward of the seal portion. The one or more drainage features extend an axial depth into the body such that a first thickness (t1) of the drainage plate at the seal portion is greater than a second thickness (t2) of the drainage plate at the one or more drainage features. Methods of manufacturing a drainage plate and manufacturing ceramic articles are also disclosed.

12 Claims, 3 Drawing Sheets

(51) Int. Cl.
    *B29C 48/11*       (2019.01)
    *B29C 48/27*       (2019.01)
    *B29C 48/76*       (2019.01)

(56)           References Cited

FOREIGN PATENT DOCUMENTS

| | | | |
|---|---|---|---|
| DE | 4403745 | C1 | 8/1995 |
| JP | S57-043962 | U | 3/1982 |
| JP | 2005-262831 | A | 9/2005 |
| WO | 2020/166589 | A1 | 8/2020 |

OTHER PUBLICATIONS

International Search Report and Written Opinion of the International Searching Authority; PCT/US2021/060255; mailed on Mar. 7, 2022, 11 pages; European Patent Office.

\* cited by examiner

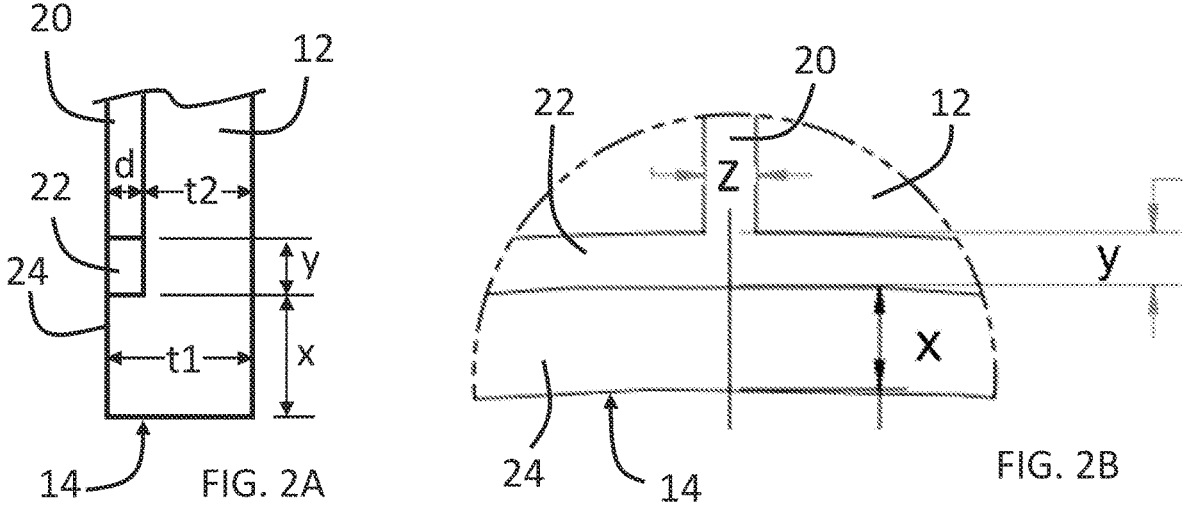
FIG. 2A
FIG. 2B
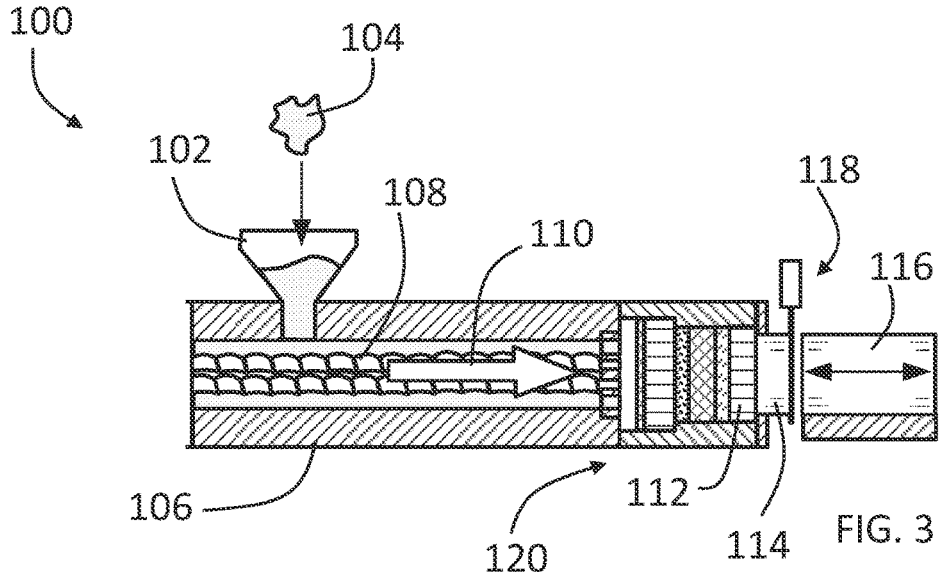
FIG. 3

DRAINAGE PLATES FOR CERAMIC EXTRUSION

This is a national stage application under 35 U.S.C. § 371 of International Application No. PCT/US2021/060255, filed on Nov. 22, 2021, which claims the benefit of priority under 35 U.S.C. § 119 of U.S. Provisional Application Ser. No. 63/119,030 filed on Nov. 30, 2020, the content of which is relied upon and incorporated herein by reference in their entireties.

BACKGROUND

1. Field

This disclosure relates to extrusion, more particularly to hardware useful in extrusion of ceramic-forming batch mixtures, and even more particularly to plates that provide drainage of one or more components of a ceramic-forming batch mixture during extrusion.

2. Technical Background

Extrusion can be used in the manufacture of ceramic articles, such as ceramic honeycomb bodies. Ceramic-forming batch mixtures can include a variety of different solid and liquid components, such as inorganic ceramic precursor particles, water, and oils or lubricants, among others. Extrusion hardware facilitating extrusion of defect-free articles from different batch mixtures is desirable.

SUMMARY

In some embodiments, a drainage plate for an extruder assembly comprises: a body having an inner edge and an outer edge; a seal portion of the body extending radially from the inner perimeter toward the outer perimeter; and one of more drainage features that are located radially outward of the seal portion; wherein the one or more drainage features extend an axial depth into the body such that a first thickness of the drainage plate at the seal portion is greater than a second thickness of the drainage plate at the one or more drainage features.

In some embodiments, the body has an annular shape with the inner edge arranged as an inner perimeter and the outer edge arranged as an outer perimeter.

In some embodiments, the seal portion fully circumscribes the inner perimeter.

In some embodiments, the one or more drainage features comprises an annular channel that fully circumscribes the seal portion.

In some embodiments, the one or more drainage features comprises a plurality of radially extending channels.

In some embodiments, the radially extending channels extend to the outer perimeter.

In some embodiments, the seal portion comprises a roughened surface of the body.

In some embodiments, the seal portion comprises an oleophilic material.

In some embodiments, the seal portion is integrally formed with the body.

In some embodiments, the seal portion comprises a coating on a base structure of the body.

In some embodiments, an extrusion assembly comprises the drainage plate of any one of the preceding paragraphs and an extrusion die.

In some embodiments, the drainage plate is upstream of the extrusion die, relative to an extrusion direction through the extrusion assembly.

In some embodiments, the drainage plate is adjacent to a flow control device.

In some embodiments, the drainage plate is located between the extrusion die and the flow control device.

In some embodiments, the flow control device comprises one or more radially movable plates to selectively block a flow area through the extrusion assembly.

In some embodiments, the drainage plate is downstream of the extrusion die, relative to an extrusion direction through the extrusion assembly.

In some embodiments, the drainage plate is adjacent to a skin forming ring.

In some embodiments, the drainage plate is located between the skin forming ring and the extrusion die.

In some embodiments, the drainage plate is downstream of the skin forming ring, relative to the extrusion direction.

In some embodiments, the extrusion assembly comprises a plurality of the drainage plates.

In some embodiments, the extrusion assembly comprises a flow control device, and the flow control device comprises the drainage plate.

In some embodiments, the flow control device comprises one or more movable plates and wherein the drainage plate is comprised by at least one of the one or more movable plates.

In some embodiments, a housing of the extrusion assembly comprises one or more ports in fluid communication with the drainage features of the drainage plate.

In some embodiments, an extruder comprises the extrusion assembly of any one of the preceding paragraphs and an extruding element configured to force a batch mixture through the extrusion assembly.

In some embodiments, a method of manufacturing a drainage plate, comprises forming one of more drainage features that extend an axial depth into a body of the drainage plate and are located radially outward of a seal portion on the body, wherein a first thickness of the drainage plate at the seal portion is greater than a second thickness of the drainage plate at the one or more drainage features.

In some embodiments, forming the one or more drainage features comprises removing material from the body.

In some embodiments, the removing comprises mechanically or chemically removing.

In some embodiments, the removing comprises photochemically removing.

In some embodiments, the method further comprises roughening a surface of the body to form the seal portion.

In some embodiments, the seal portion is adjacent to an inner edge and the drainage features extend to an outer edge of the body.

In some embodiments, the body has an annular shape with the inner edge arranged as an inner perimeter and the outer edge arranged as an outer perimeter, wherein the seal portion fully circumscribes the inner perimeter, and wherein forming the one or more drainage features comprises forming an annular channel that fully circumscribes the seal portion and forming a plurality of radially extending channels that each extend from the annular channel to the outer perimeter.

In some embodiments, a method of manufacturing a ceramic article, comprises: pressurizing batch mixture to force the batch mixture through an extrusion die of an extrusion assembly, removing only a liquid phase component of the batch mixture from the extrusion assembly during extrusion.

In some embodiments, the extrusion assembly comprises a drainage plate and wherein the removing comprises permitting migration of the liquid phase component radially past a seal portion of the drainage plate while preventing solid components of the batch mixture from radially migrating past the seal portion.

In some embodiments, the removing comprises radially migrating the liquid phase component to an outer edge of the drainage plate in one or more channels that extend to the outer edge.

In some embodiments, the liquid phase component comprises water, an oil, a lubricant, a lipid, or a mixture thereof.

In some embodiments, the removing occurs before the batch mixture is forced through the extrusion die.

In some embodiments, the removing occurs after the batch mixture is forced through the extrusion die.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

BRIEF DESCRIPTION OF THE DRAWINGS

FIG. 2A is a cross-sectional view of the portion of the drainage plate taken generally along line 2A-2A in FIG. 1.

FIG. 2B is an enlarged view of the encircled area indicated in FIG. 1.

FIG. 3 schematically illustrates an extruder according to an embodiment disclosed herein.

DETAILED DESCRIPTION

Figure 1:
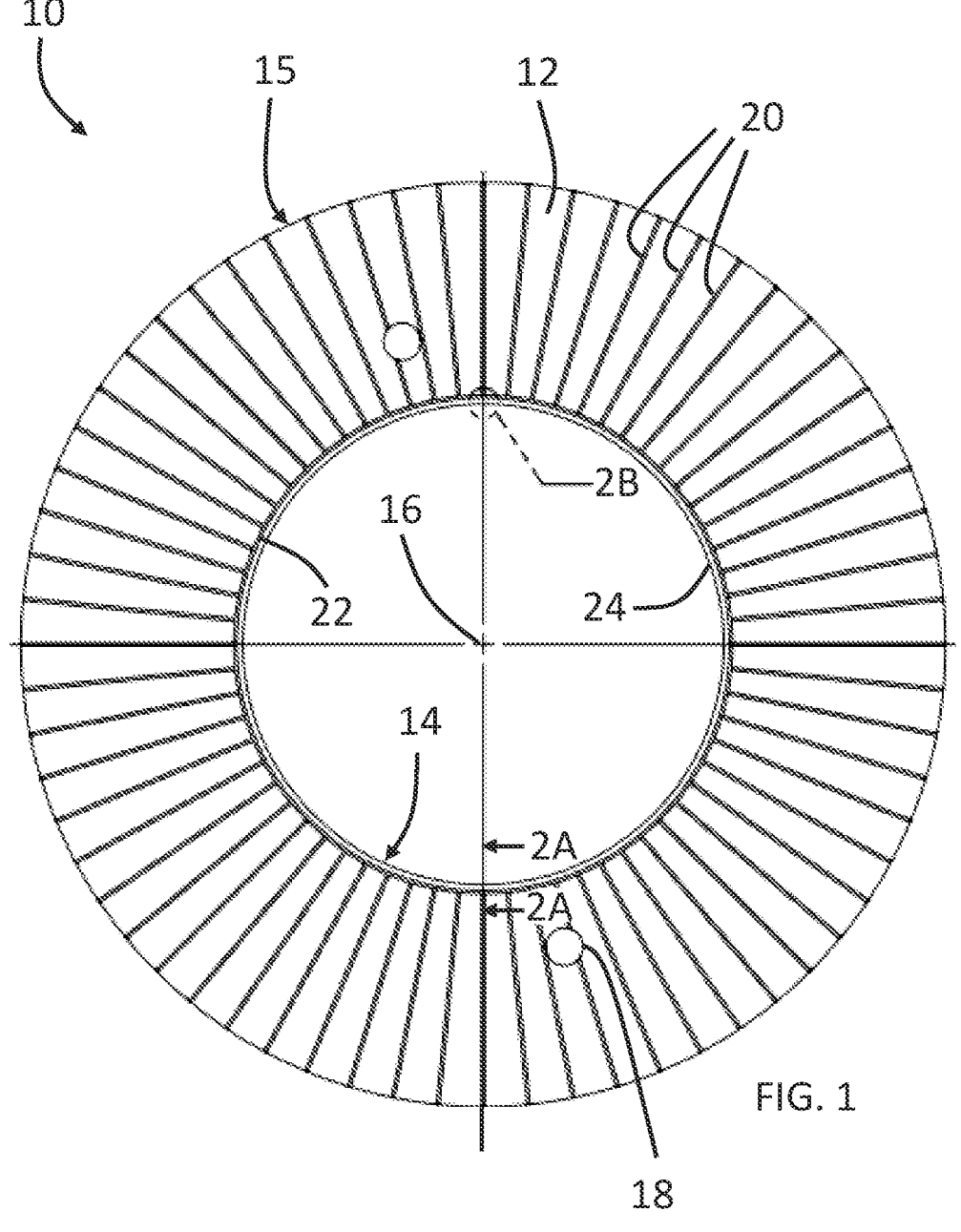
FIG. 1 illustrates a drainage plate according to one embodiment disclosed herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

Ceramic-forming mixtures, which may be referred to herein as "batch mixtures", used in the manufacture of ceramic articles can contain various components, such as inorganic ceramic precursor particles (which react and/or sinter to form one or more ceramic phases for the ceramic articles), temporary binders such as methylcellulose to improve extrudability of the batch mixture and/or handling the green state, a liquid carrier, such as water to enable the batch mixture to be mixed and extruded, and one or more oils, lubricants, and/or extrusions aids to alter the rheology of the batch mixture and/or the interaction of the components of the batch mixture with each other or with the extrusion equipment (e.g., by reducing the extrusion pressure necessary to extrude the batch mixture through the extrusion equipment), such as tall oil, polyalphaolefin (PAO), oleic acid, and mineral oil, among others. Ceramic precursors as referred to herein can comprise ceramic and/or ceramic-forming materials, such as clay, talc, alumina, silica, titania, magnesia, cordierite, or other inorganic particles. The use of PAO or other lubricants can be helpful for lowering extrusion pressure and improving the wear rate of extrusion dies and other hardware.

Microscopically, the batch mixture is a system of rigid, or semi-rigid, packed particles (the aforementioned ceramic precursors), with fluid residing in the void volume between particles. As the batch is compressed to high pressure at least a few thousand psi or more) by the extruder during the extrusion process, the particle packing and particle density increases, thus fluid may be 'squeezed out' or displaced from the microscopic voids between particles. This fluid may migrate outwardly toward the housing of the extruder and/or pool or collect near various extrusion hardware components, such as at shims, flow control devices such as a bow busters, the extrusion die, and/or a skin forming mask. For example, these hardware components can be arranged at the front end of the extruder as a series of plates or rings that are assembled together axially in a "stack". When so arranged, fluid (such as oil, water, oleic acid or other liquid phase components), may accumulate in, at, or along the interfaces between these hardware components. For example, even if the machine tolerances of some components are very small, e.g., +/−0.001", these tolerances will result in the creation of small volumes at the interfaces that provide reservoirs for the liquid phase components of the batch mixture to accumulate. The liquid phase may additionally or alternatively accumulate at the interface with the inner diameter of the extruder housing at the outer periphery of the flow path through the extrusion equipment.

As extrusion proceeds, (e.g., and these interfaces become filled and saturated with fluid), the fluid may intermittently stream out of the extrusion hardware, and create streaks on the surface of the extrudate (e.g., extruded log or other article, which may be referred to as a green body and/or as in the green state). These streaks of fluid on the surface of the extruded article may undesirably effect manufacture of the ceramic article, such as resulting in the formation of fissures, cracks, tears, or other defects at the locations where the streaks are present. For example, defects may result from these fluid streaks at least in part due to uneven drying of the surface of the extruded article where the streaks are present. Without wishing to be bound by theory, it is believed that the extruded green body under the fluid streak remains weak as the extruded article shrinks during drying, which may split open as an axially-aligned crack or fissure.

Advantageously, the drainage plates described herein have drainage features that enable the passive removal of liquid components from the batch mixture during extrusion, thereby preventing the accumulation of fluids (e.g., at hardware interfaces) during the extrusion process. For example, the drainage features can comprise grooves or channels formed into the surface of the plate that promotes the migration of one or more liquid phase components of the batch mixture away from the extrusion hardware, where the liquid phase components will not be expelled as streaks or streams onto the surface of the extrudate. In this way, the embodiments described herein can be useful for reducing or even eliminating fluid streaking on extrudate and the defects (e.g., cracks or fissures) associated therewith.

Referring to FIG. 1, a drainage plate 10 is illustrated according to one embodiment. The drainage plate 10 comprises a body 12 that has an inner edge 14 and an outer edge 15. The drainage plate 10 can be arranged such that it is symmetrical about a central axis 16. The drainage plate 10 can comprise through-holes 18 to aid in assembly in an extruder. For example, the through-holes 18 can be configured to receive a bolt or other fastener that enables the drainage plate 10 to be secured to one or more adjacent hardware components (e.g., an extrusion die, a flow control device, etc.) in a stack at the front end of a extruder.

In the illustrated embodiment of FIG. 1, the body 12 is an annular or ring shaped body, such that the inner edge 14 is an inner perimeter (or inner circumference) and the outer edge 15 is an outer perimeter (or circumference). Accordingly, the inner and outer edges 14 and 15 are circular in the embodiment of FIG. 1, but can alternatively take any other shape, e.g., depending on the geometry of the extruder into which the drainage plate 10 is installed, such as rectangular or other polygonal shape. For ease of discussion, reference herein to a radius or radii of the drainage plate 10 is not limited to circularly-shaped plates (e.g., as shown in FIG. 1), but instead can refer to any line extending outwardly from the central axis 16 regardless of the shape of the body 12 of the drainage plate 10, and similarly, reference to the radial direction refers to the direction of any such line.

In accordance with the advantages and embodiments described herein, the drainage plate 10 comprises one or more drainage features that promotes the migration of fluids (e.g., water, oil, or other liquid phase component) away from the batch mixture being extruded. For example, as shown in more detail in the views of FIGS. 2A and 2B, the drainage plate 10 according to the embodiment of FIG. 1 comprises a plurality of channels 20 that promote the migration of such fluids. For example, the channels 20 can be formed as grooves, indentations, cavities, troughs, or other features (which may collectively be referred to herein as channels for ease of discussion) having a depth, shown in the cross-section of FIG. 2A as a depth d, into the axial face of the body 12 of the drainage plate 10. The channels 20 also have a dimension, e.g., width, designated as width z in FIG. 23. The width z can be consistent throughout the length of the channels 20 or variable at different locations. In the embodiment of FIG. 1, the channels 20 extend radially outwardly to the outer edge 15 of the body 11 in this way, for example, accumulated fluid can be migrated to the outer edge 15 where the fluid is expelled, thus preventing the fluid from being deposited as streaks on the outer surface of the extruded articles as described herein.

The drainage features of the drainage plate are not limited to radially extending channels. For example, as also shown more clear in the detailed views of FIGS. 2A and 2B, the drainage plate 10 can comprise a transverse channel 22 that connects between all of the radial channels 20. The transverse channel 22 has a radial dimension, e.g., width, designated in FIG. 23 as a width y. The width y of the transverse channel 22 can be the same as the width z of the radial channels 20 or take a different value. The width y can be consistent throughout the channel 22 or variable at different locations. In the embodiment of FIGS. 1-23, the radial channels 20 extend from the transverse channel 22 to the outer edge 15. In some embodiments, the transverse channel 22 is continuous such that it can receive fluid from any angular location and then direct and/or distribute the fluid into one or more of the radial channels 20 for migration of the fluid away from the batch mixture.

One consideration relevant to the extrusion of a ceramic-forming batch mixture is that it would be undesirable for ceramic-forming components, e.g., inorganic particles, to also migrate radially. For example, the migration of ceramic precursor particles may create process waste of valuable batch mixture components, fill or block the drainage features which correspondingly prevents removal of the liquid components, and also frustrate the ability to perform hydraulic cartridge extraction that is required for changing the extrusion die in some extruders. Accordingly, in some embodiments, the drainage plate 10 comprises a seal portion 24 that permits one or more components of the batch mixture from migrating radially outwardly, while preventing one or more different components from migrating. For example, the seal portion 24 can create a seal with respect to an axially adjacent piece of hardware in the extrusion assembly stack (e.g., a metal-to-metal seal, in the case of metallic hardware components), which prevents inorganic particles or other solid phase components of the batch mixture from migrating outwardly, while permitting water, oil, or other liquid phase components to migrate radially past the seal portion 24 and into and/or along the drainage features (e.g., along the channels 20).

In the embodiment of FIG. 2A, the seal portion 24 is arranged such that a first thickness t1 of the body 12 at the seal portion 24 is relatively larger than a second thickness t2 of the body 12 at the drainage features, such as the channels 20 and/or 22. That is, the second thickness t2 results from the channels 20 having the depth d, such that the first thickness is equal to the sum of second thickness and the depth of the channels (t1=t2+d). Due to the different dimensions, one or more first components of the batch mixture, e.g., solid inorganic particles, are prevented by the seal portion 24 from migrating radially outwardly, while one or more second components of the batch mixture, e.g., water, oil, or other liquid phase components, are not prevented from migrating past the seal portion 24.

The depth d in some embodiments is in the range of about 0.001", such as from 0.0005" to 0.002". In some embodiments, the depth d is at most 0.002". In some embodiments, the drainage plate 10 is in the form of a shim, with the thickness t1 of about 0.005", such as from 0.004" to 0.01". In some embodiments, the thickness t1 is significantly greater than 0.005", such as up to one or more inches, particularly if the drainage plate 10 is formed as part of a flow control device, a skin forming ring, or other hardware component as described in more detail herein.

In some embodiments, the seal portion 24 is integrally formed with the remainder of the body 12. In some embodiments, one or more properties of the seal portion 24 are selected to set a resistance to flow past the seal portion 24 by the solid and/or liquid components of the batch mixture. In some embodiments the resistance to fluid flow is set by adjusting the surface roughness of the seal portion 24. For example, the seal portion 24 can undergo a roughening process, such as a mechanical abrading process. In this way, roughening process can create micro-sized gouges or "microchannels", e.g., smaller in the size than the solid particles in the batch mixture, which microchannels enable the expelled fluid to can get pushed radially past the seal portion 24, while the large particles of the batch mixture are not. That is, the high pressure of extrusion provides a driving force to push the expelled fluid radially through the microchannels. The microchannels of the seal can be increased in size by intentionally roughening the surface to a greater degree. For example abrading with fine grit sandpaper can create relatively finer microchannels in comparison to deeper microchannels formed by relatively coarser grit sandpaper.

In addition to roughness, the radial dimension of the seal portion 24, designated in FIGS. 2A and 23 as dimension x, can be set to further control the resistance to drainage and/or drainage rate. For example, a radially longer seal length (larger values of dimension x) will provide a greater resistance to flow, and correspondingly slower drainage rate, while a narrow seal length (smaller values of dimension x) will promote less flow restriction and corresponding an increased drainage rate. Accordingly, the dimension x can be utilized to set or adjust the drainage rate and/or to promote the selective migration of one or more components of the batch mixture (e.g., only the liquid phase components), for any given roughness of the seal portion 24.

In some embodiments, the seal portion 24 can be formed as a coating applied to a base structure of the body 12 and/or as a separate component that is affixed to form the body 12. In some embodiments, the thickness of such a coating is equal to the depth d (FIG. 2A), such that the drainage features (channels 20 and/or 22) are formed by uncoated portions of the body 12. In some embodiments, the material of the seal portion 24 is selected such that it is generally oleophilic, thereby promoting the migration of oils, while limiting the migration of aqueous components. For example, the seal portion 24 can be formed by applying an oleophobic coating, such as polytetrafluoroethylene (PTFE) to a base structure of the body 12. Since many metals, such as steel, are generally oleophobic, the seal portion 24 in some embodiments comprises steel.

In some embodiments, e.g., as shown in FIGS. 1-2B, the seal portion 24 is continuous along an entirety of the inner edge 14. For example, when the body 12 is annular and the inner edge 14 is therefore a circle, the seal portion 24 can fully circumscribe the inner edge 14. In some embodiments, the transverse channel 22 is an annular channel (as shown in FIG. 1) that fully circumscribes the seal portion 24, e.g., thereby enabling the transverse channel 22 to receive expelled fluids at any angular location.

In some embodiments, the transverse channel 22 is located at a radial location along the length of the radial channels 20. In some embodiments, the drainage plate 10 comprises a plurality of the transverse channels 22 at multiple radial locations, e.g., creating an interconnected network of channels. In some embodiments, instead of extending radially in straight lines, the drainage features of the drainage plate 10 can emanate outwardly at one or more angles transverse to the radii of the plate 10, or in a pattern such as an outward spiral, as oscillating channels (e.g., sinusoidal or zig-zig), or a pattern of crisscrossed channels. In some embodiments, the channels 20, the channels 22, or other drainage features can all have the same depth d, or different depths. Similarly, the depth d can be consistent at all locations along any given channel, or can be variable along the drainage channels. For example, the channels 20 can be deeper or shallower toward the inner edge 14 or toward the outer edge 15.

In some embodiments, the drainage features of the drainage plate comprises sizes or shapes other than relatively thin, long channels. In some embodiments, the drainage features comprise large areas that span both radial and transverse directions in amounts greater than the dimension y and z shown. In some embodiments, in lieu of relatively thin, long channels, the entirety of the body 12 other than at the seal portion 24 (that is, the entirety of the annular portion radially outside of the seal portion 24 and extending to the outer edge 15) is formed as a drainage feature having the depth d relative to the first thickness t1 of the seal portion. In some embodiments, the drainage features comprise a plurality of wedges extending toward the outer edge 15, e.g., spanning an angle of 5° or more. The drainage features can be formed by any suitable process, such as a mechanical process (e.g., cutting, abrading, grinding, or other machining process), or a chemical process, such as etching, e.g., photochemical etching. The drainage features, e.g., the channels 20 and/or 22, can be formed in one or both axial surfaces of the body 12.

One or more of the drainage plates 10 can be installed adjacent to any extrusion hardware component in the hardware stack at the extrusion end of an extruder. For example, an extruder 100 is illustrated in FIG. 3, comprising an inlet (e.g., hopper) 102 for receiving a batch mixture 104. The batch mixture 104 is mixed and/or pressurized within a barrel 106 of the extruder 100 by one or more extruding elements, such as a twin screw 108. Alternatively, the extruder 100 can comprise a ram or other extrusion element. The pressurization of the batch mixture 104 causes the batch mixture 104 to be forced in an extrusion direction 110 toward and then through an extrusion die 112. The batch mixture 104 is accordingly extruded as an extrudate 114. The extrudate 114 can be cut at desired lengths to create green bodies 116 via a cutting mechanism 118, e.g., a blade, saw, wire, laser, or other implement. The green bodies 116 can be processed in one or more subsequent manufacturing steps, e.g., drying, grinding, transportation, and firing, in order to create ceramic articles from the green bodies 116 by converting the ceramic precursor materials in the green body 116 (from the batch mixture 104) into one or more ceramic phases for the ceramic articles. When the extrusion die 112 is a honeycomb extrusion die, the resulting ceramic articles can be ceramic honeycomb bodies, such as useful in the manufacture of catalyst substrates and particulate filters.

As generally shown in FIG. 3, the extrusion die 112 can be part of an extrusion assembly 120 comprising a stack of hardware components at the extrusion end of the extruder 100. For example, the stack of hardware components in the extrusion assembly 120 can additionally comprise one or more of a flow control devices, such as a "bow buster" or an edge-flow control device, a skin forming ring or mask, a tail ring, a shims or spacer plate, or combinations including at least one of the foregoing. Examples of suitable extrusion hardware components are described in U.S. Patent Publication No. 2020/0269466 to Hodel et al., the disclosure of which is hereby incorporated by reference in its entirety.

Figure 4:
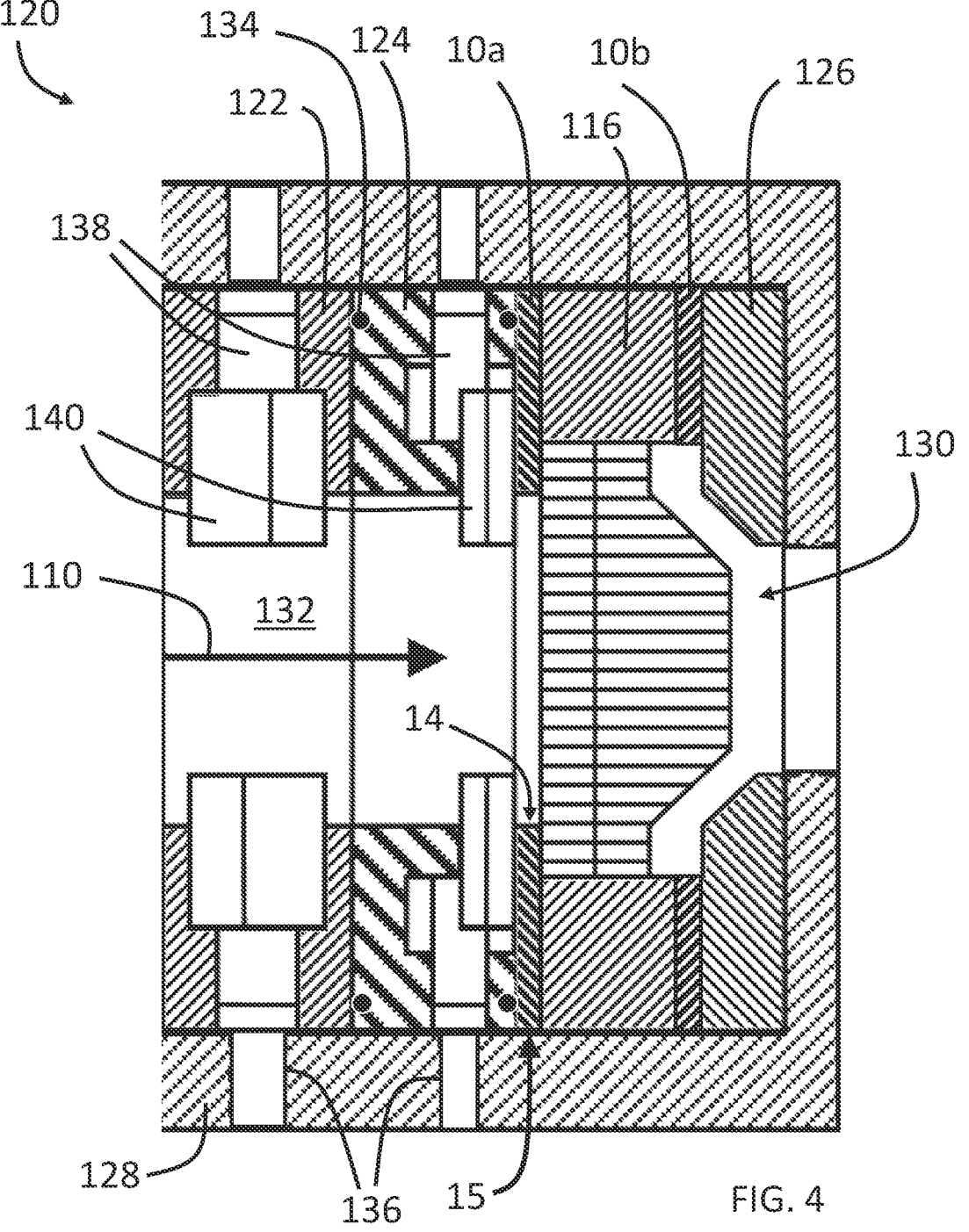
FIG. 4 schematically illustrates an extrusion assembly for an extruder comprising an extrusion die and a drainage plate according to an embodiment disclosed herein.

One embodiment for the extrusion assembly 120 is shown in FIG. 4. In the embodiment of FIG. 4, the extrusion assembly 120 comprises, axially stacked in the extrusion direction 110, a first flow control device 122 (e.g., a bow buster), a second flow control device 124 (e.g., an edge flow control device), a first instance of the drainage plate 10 designated with reference numeral 10a, the extrusion die 112, a second instance of the drainage plate 10 designated with reference numeral 10b (the drainage plates 10a and 10b otherwise resembling any embodiment of the drainage plate 10 described herein), and a skin forming mask 126, which are together contained within a housing 128 of the extruder 100. The extrusion die 112 comprises a plurality of openings at a discharge face 130 that defines the shape of the extruded articles, e.g., a honeycomb structure for manufacturing ceramic honeycomb bodies. The hardware components of the extrusion assembly 120 can each take the general form of a ring, thereby defining a flow area 132 for the batch mixture to travel through the assembly 120.

While two of the drainage plates 10 are shown in the embodiment of FIG. 4 (namely, drainage plates 10a and 10b), any number of the drainage plates 10 can be included in other embodiments. Furthermore, the drainage plates 10 can be located adjacent to any hardware component as desired, including multiples of the drainage plates 10 adjacent to each other (the drainage features facing each or other facing opposite directions). Furthermore, the drainage plates 10 can be located upstream and/or downstream of the extrusion die 112, relative to the extrusion direction 110 of batch material through the extrusion die 112, with drainage plate 10a shown upstream and drainage plate 10b shown downstream in the embodiment of FIG. 4.

Due to the drainage features extending an axial depth (the depth d of FIG. 2A) into the surfaces of the drainage plates 10, the migration of the selected fluids can be migrated radially away from the batch mixture in the flow area 132 even if adjacent hardware components are sealed together. For example, in FIG. 4 an o-ring or other sealing element 134 is illustrated between the first and second flow control devices 122 and 124, and between the second flow control device 124 and the drainage plate 10a. Without the drainage features, the expelled fluid from the batch mixture may be trapped by the sealing elements 134 and therefore accumulate at the interfaces between these (or other) hardware components. Accordingly, the drainage features of the drainage plate(s) 10 advantageously enable the fluids to migrate radially away from the batch mixture, where it can be removed from the extruder 100.

In the embodiment of FIG. 4, the fluids that are radially migrated away from the flow area 132 can be removed via one or more ports 136 that extend through the housing 128. For example, the ports 136 can be arranged specifically as drainage ports for removal of the migrated fluids, or can be access ports for one or more of the hardware components. For example, in the illustrated embodiment of FIG. 4, the first and second flow control devices 122 and 124 each comprise an actuatable component 138 (e.g., threaded bolt) that can be manipulated by a corresponding tool (e.g., wrench or screwdriving device) inserted through the ports 136. For example, the actuatable components 138 can be connected to one or more shutter plates 140 that can be radially inserted further into, or retracted out of, the flow area 132 via manipulation of the actuatable components 138. By altering the position of the shutter plate(s) 140, the flow rate of batch material can be selectively increased or decreased at various locations in the flow area 132. Controlling the flow rate of the batch material can be useful in reducing or eliminating bow, as well as extrudate defects, e.g., which result from non-uniform flow (different flow velocities at different locations of the die). The first and second flow control devices 122 and/or 124 can comprise the shutter plates 140 as a single annular plate having an opening therethrough, or as a plurality of independently movable segments that together form an annular shape.

In some embodiments, the first flow control device 122, the second flow control device 124, the extrusion die 112, the skin forming ring 1 comprises the drainage plate 10. For example, the main ring-shaped body of these various hardware components can comprise the herein described drainage features and thus be arranged as the drainage plate 10. In some embodiments, the shutter plate(s) 140 comprise the herein described drainage features and are thus arranged as the drainage plate 10. For example, in some embodiments, the drainage plate 10 is not formed as a single annular ring, but instead as one or more individually movable segments in a plurality of segments that together form an annular shape.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A drainage plate for an extruder assembly comprising:
a body having an inner perimeter and an outer perimeter;
a seal portion of the body extending radially from the inner perimeter toward the outer perimeter;
one or more drainage features located radially outward of the seal portion; and
wherein the one or more drainage features extend an axial depth into the body such that a first thickness of the drainage plate at the seal portion is greater than a second thickness of the drainage plate at the one or more drainage features, wherein:
the one or more drainage features comprises a plurality of radially extending channels extending to the outer perimeter,
the one or more drainage features comprises an annular channel that fully circumscribes the seal portion and is provided on an inner radial side of the plurality of radially extending channels, and
the seal portion is configured to form a seal with respect to an axially adjacent surface of the extruder assembly and selectively permit liquid phase components of a batch mixture to migrate radially past the seal portion and into and/or along the one or more drainage features.

2. The drainage plate of claim 1, wherein the body has an annular shape.

3. The drainage plate of claim 2, wherein the seal portion fully circumscribes the inner perimeter.

4. The drainage plate of claim 1, wherein the seal portion comprises a roughened surface of the body.

5. The drainage plate of claim 1, wherein the seal portion comprises an oleophilic material.

6. The drainage plate of claim 1, wherein the seal portion is integrally formed with the body.

7. The drainage plate of claim 1, wherein the seal portion comprises a coating on a base structure of the body.

8. An extrusion assembly comprising the drainage plate of claim 1 and an extrusion die.

9. The extrusion assembly of claim 8, wherein the drainage plate is upstream of the extrusion die, relative to an extrusion direction through the extrusion assembly.

10. The extrusion assembly of claim 8, wherein the drainage plate is downstream of the extrusion die, relative to an extrusion direction through the extrusion assembly.

11. The extrusion assembly of claim 8, comprising a plurality of the drainage plates.

12. The extrusion assembly of claim 8, wherein a housing of the extrusion assembly comprises one or more ports in fluid communication with the drainage features of the drainage plate.

* * * * *